United States Patent [19]
Shetler et al.

[11] Patent Number: 5,657,793
[45] Date of Patent: Aug. 19, 1997

[54] VACUUM CLEANER HOSE AND METHOD FOR MAKING SAME

[75] Inventors: Daniel W. Shetler, North Canton; Larry W. Bryson, Massillon, both of Ohio

[73] Assignee: The Hoover Company, North Canton, Ohio

[21] Appl. No.: 571,705

[22] Filed: Dec. 6, 1995

Related U.S. Application Data

[60] Continuation of Ser. No. 213,547, Mar. 16, 1994, abandoned, which is a division of Ser. No. 38,874, Mar. 29, 1993, Pat. No. 5,330,699.

[51] Int. Cl.$^6$ ..................... F16L 11/11
[52] U.S. Cl. ............. 138/121; 138/177; 138/DIG. 11; 181/196; 181/247
[58] Field of Search ................ 138/121, 122, 138/154, 177, DIG. 5, DIG. 11; 181/196, 206, 224, 247

[56] References Cited

U.S. PATENT DOCUMENTS

| | | | |
|---|---|---|---|
| 2,663,321 | 12/1953 | Jantsch | 138/DIG. 11 |
| 3,605,817 | 9/1971 | Bauman et al. | 138/121 |
| 3,913,622 | 10/1975 | Holden | 138/121 |
| 4,024,894 | 5/1977 | Drossbach | 138/121 |
| 4,163,619 | 8/1979 | Fales | 138/121 |
| 4,534,923 | 8/1985 | Lupke | 138/121 |
| 4,655,986 | 4/1987 | Cothran et al. | 138/121 |
| 4,802,511 | 2/1989 | Hensley | 138/177 |

*Primary Examiner*—David Scherbel
*Assistant Examiner*—James F. Hook
*Attorney, Agent, or Firm*—Renner, Kenner, Greive, Bobak, Taylor & Weber

[57] ABSTRACT

A method and apparatus for manufacturing a hose for a vacuum cleaner, such hose having anti-whistling characteristics. In a standard blow molding process, a blow pipe is configured with a plurality of printing rollers having arcuate outer surfaces configured and spaced in such a manner as to assure engagement of the entirety of the hose with a printing roller during the manufacturing process. The printing rollers are provided with apertures which, upon engagement with the tacky material of the inner surface of inwardly extending corrugations causes indentations or protrusions in such surface. The roughened interior surface prevents the formation of audible harmonics when air passes through the tube response to a vacuum source at one end thereof.

4 Claims, 3 Drawing Sheets

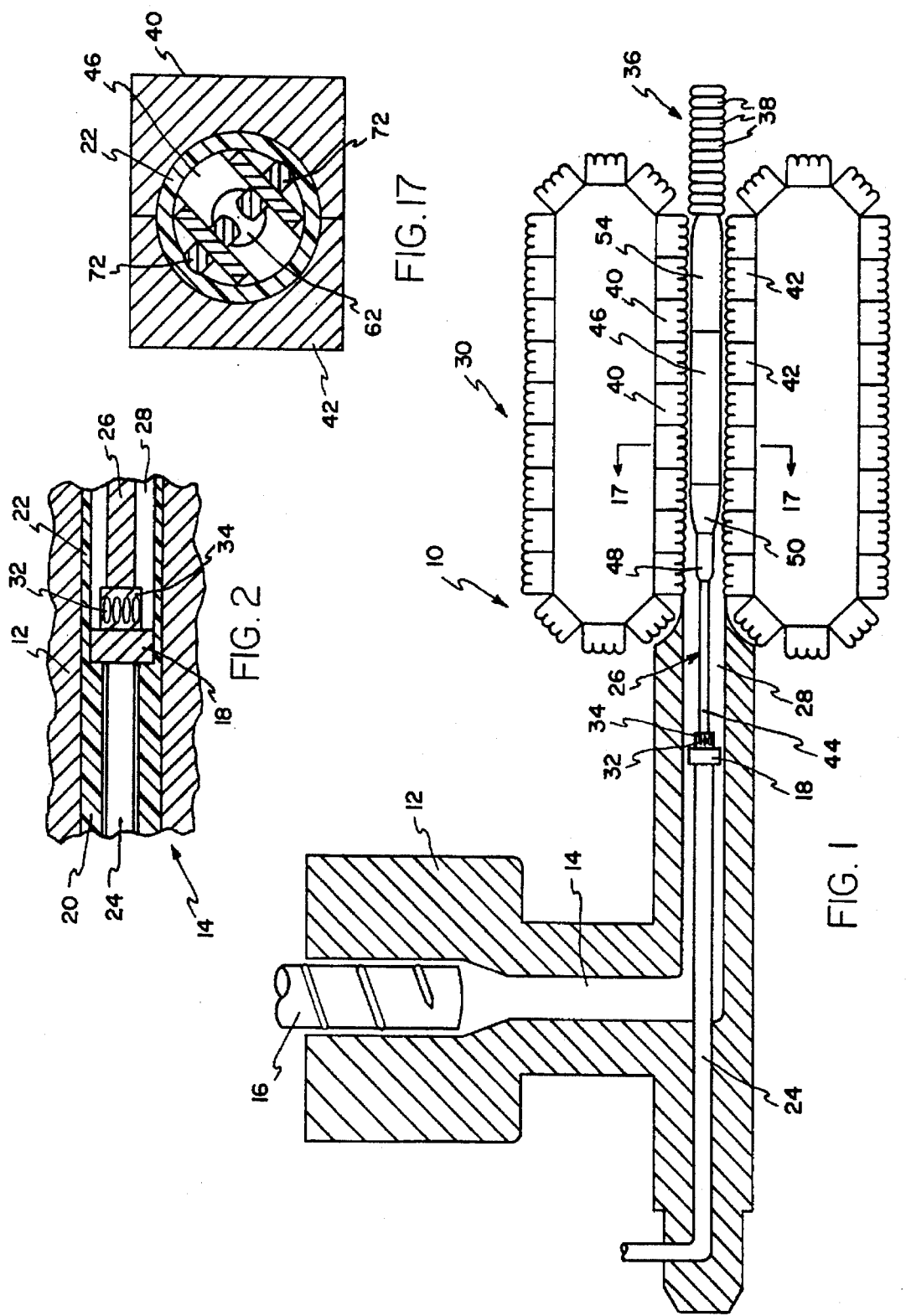

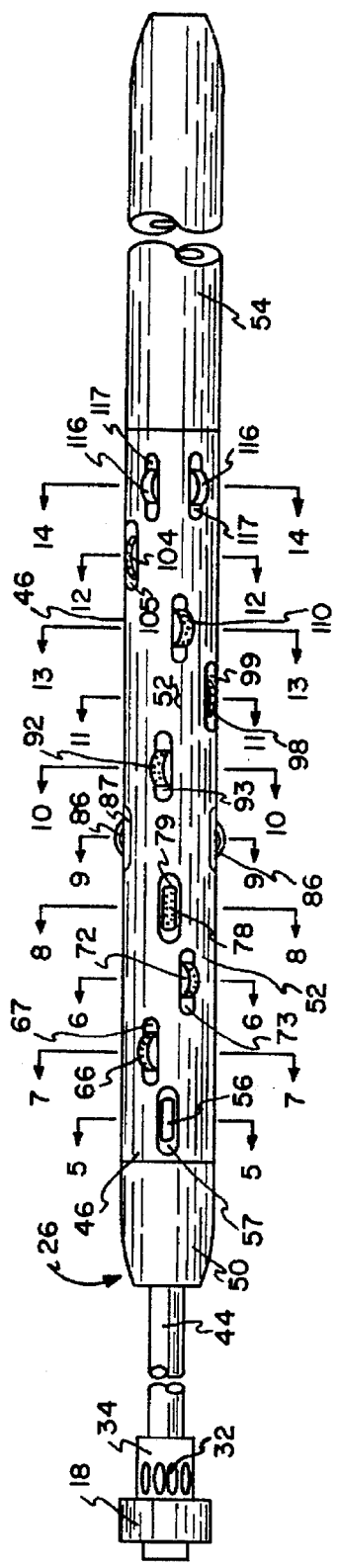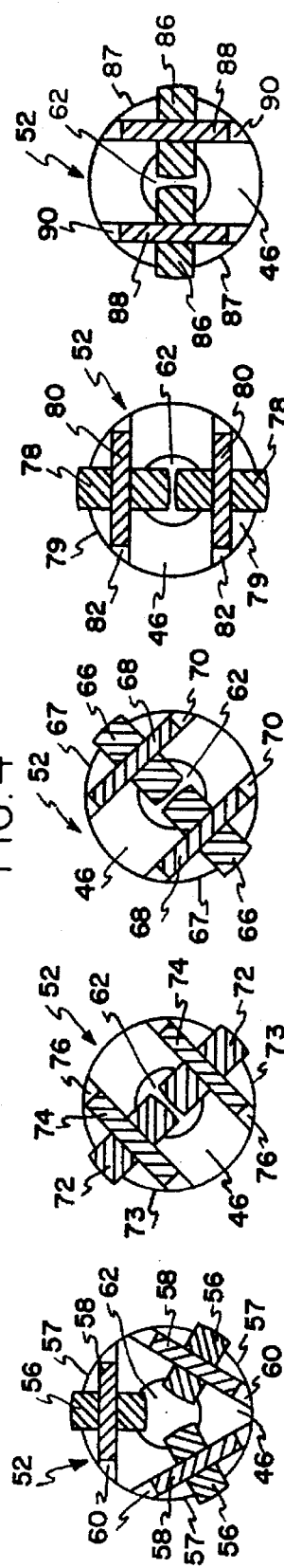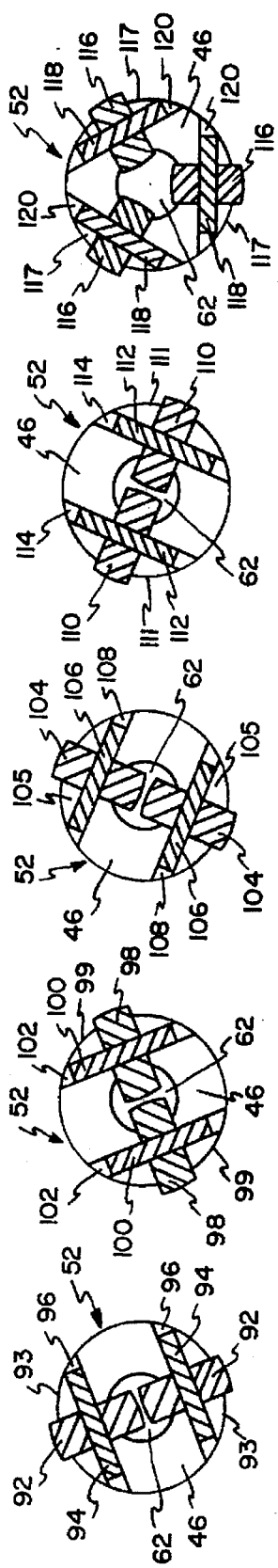

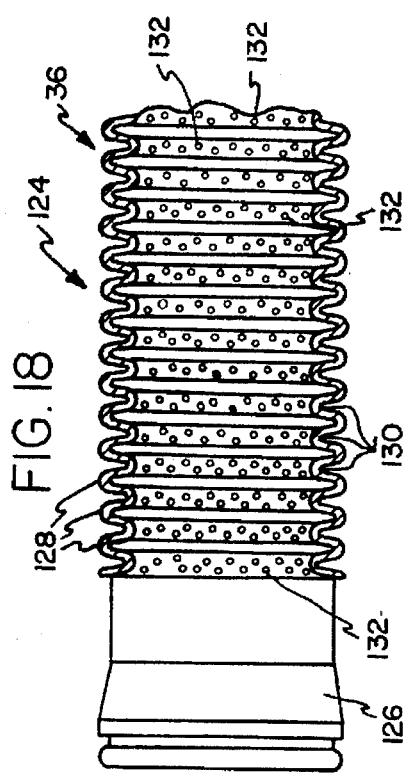
FIG. 18
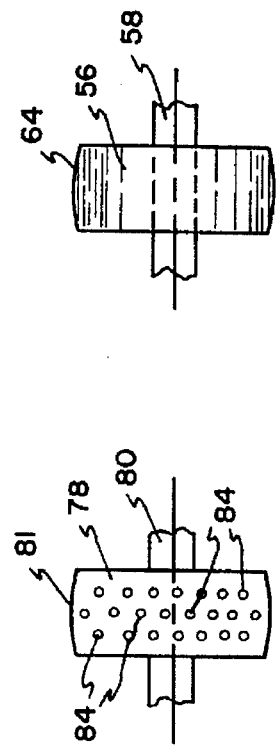
FIG. 15
FIG. 16
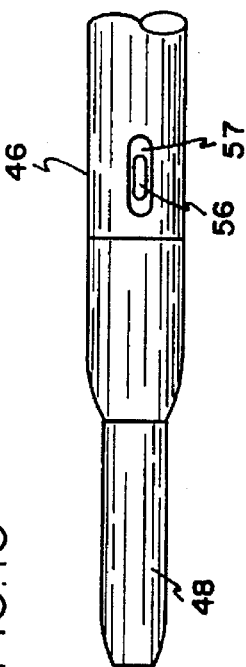
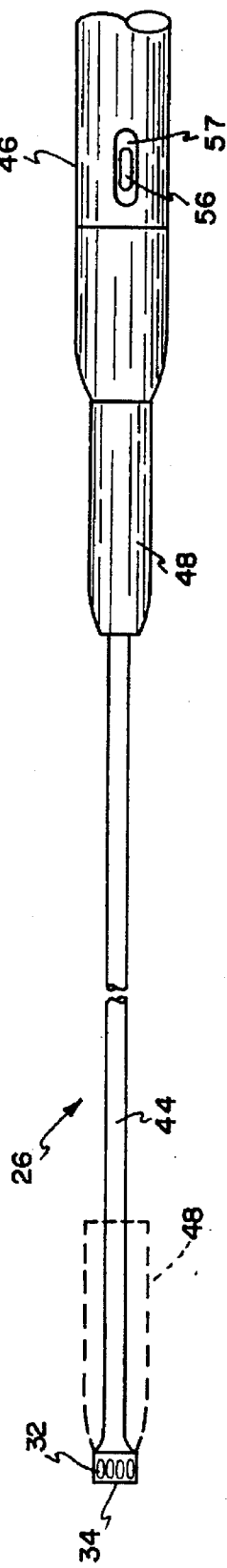
FIG. 3

VACUUM CLEANER HOSE AND METHOD FOR MAKING SAME

This application is a continuation of application Ser. No. 08/213,547, filed Mar. 16, 1994, now abandoned which was a division of application Ser. No. 08/038,874, filed Mar. 29, 1993, now U.S. Pat. No. 5,330,699, issued on Jul. 19, 1994.

TECHNICAL FIELD

The invention herein resides in the art of cleaning devices and, more particularly, to vacuum cleaners. Specifically, the invention relates to suction hoses for vacuum cleaners of the flexible and corrugated type. More specifically, the invention relates to such a hose having anti-whistling properties.

BACKGROUND ART

Flexible corrugated hoses are in common use with vacuum cleaners. Today, both canister and upright cleaners employ such hoses for interconnecting the vacuum source with a cleaning tool. Though vacuum cleaner hoses are of various configurations, the most common hoses are corrugated, defined by uniformly axially displaced ribs extending inwardly and outwardly of the hose. Oftentimes, the hoses are extendable or stretchable.

The inwardly extending ribs of the corrugated hoses are typically uniformly spaced and define uniformly spaced cavities or recesses therebetween. Additionally, the inner surfaces of the inwardly extending ribs are generally smooth. The uniform spacing, width, and depth or protrusion of the inwardly extending ribs have been known to generate audible sounds or whistles as air in the hose passes thereover when the hose is connected to a vacuum source. The audible sounds or whistles are set at a characteristic harmonic frequency which is a function of the width, spacing, and depth of protrusion of the inwardly extending ribs. As the hose is stretched or extended, the space, width, and protrusion depth of the inwardly extending ribs changes, but the uniformity of such features remains the same. Accordingly, the characteristic harmonic frequency of the hose changes with a resultant change in the tone of the whistle or audible sounds. Such whistling is highly objectionable to most consumers, since it is generally felt that noise incident to operation of a vacuum cleaner should be minimized.

It has been known that the characteristic whistling of vacuum cleaner hoses can be substantially eliminated by altering the space, width, and protrusion depth of the inwardly extending ribs and by configuring the inner rib surfaces to introduce turbulence and thereby eliminate the objectionable audible harmonics. However, the methodology for achieving such structure has been complex in nature and expensive to employ.

U.S. Pat. No. 2,600,254 presents methods for treating interior and exterior surfaces of extruded plastic tubing. A cylindrical die plug or a rotary die member is used to provide indentations on the interior wall surface of the tube. In either event, die members which are both interior and exterior of the of the tube are employed.

U.S. Pat. Nos. 3,015,857 and 3,185,182 provide means for forming a corrugated thermoplastic tube employing a vacuum drawing method. A vacuum forming element is positioned interior of the tube during the forming process. Apertures in the forming element communicate a vacuum to the interior of the tube. While it is possible that such apertures might tend to form small protrusions in the innermost diameter of the hose material, it is unlikely that such protrusions would be sufficient to preclude the generation of noise or whistling if the finished tube were used as an air conduit.

U.S. Pat. No. 3,240,645 teaches the formation of a corrugated hose employing a mandrel, wherein the mandrel has a plurality of small holes therein to allow for pressurization of the hose for ease of removal when the formation process is complete. While such holes might provide some type of imperfection on the interior surface of the hose, the same is not seen as being sufficient to preclude whistling or the like, nor provided for that purpose.

U.S. Pat. No. 3,605,817 presents a corrugated tube in which internal protrusions or "pimples" are formed by external die blocks. The protrusions or pimples "roughen" the interior surface of the tube to attenuate whistling and the like. The internal surfaces are formed by the provision of internal air pressure forcing the tube outwardly against an external die, without any additional mechanical forming process.

Finally, Canadian Patent 590,953 is of general interest in that it presents forming members having a series of small holes to contact a tube during the forming process. However, the holes are used to provide an escape path for water during a drying step in the forming process, and not to form any specific desired surface configuration.

DISCLOSURE OF INVENTION

In light of the foregoing, it is a first aspect of the invention to provide a flexible corrugated vacuum cleaner hose having anti-whistling properties.

Another aspect of the invention is the provision of a flexible corrugated vacuum cleaner hose with anti-whistling properties which is formed by "printing" the inner surface of the hose corrugations to interrupt smooth surfaces extending into the hose.

A further aspect of the invention is the provision of an apparatus for manufacturing a flexible corrugated vacuum cleaner hose which prints the inner surface of the corrugations thereof during the extrusion and blow molding process by which the hose is formed.

Yet another aspect of the invention is the provision of an apparatus for manufacturing a flexible corrugated vacuum cleaner hose which treats the entire inner surface of inwardly extending ribs of the hose by imparting indentations and/or protrusions thereto.

Still a further aspect of the invention is the provision of an apparatus for manufacturing a flexible corrugated vacuum hose without substantial uniformity or consistency in the surface geometry of the interior of the hose.

An additional aspect of the invention is the provision of an apparatus for manufacturing a flexible corrugated vacuum cleaner hose which is durable and reliable in operation, and readily conducive to implementation with presently existing hose manufacturing apparatus and techniques.

The foregoing and other aspects of the invention which will become apparent as the detailed description proceeds are achieved by an apparatus for interrupting the inner surface of a flexible, corrugated hose, comprising: an extrusion die for forming the hose; and a printing die received within the hose during the formation of the hose, said printing die having a plurality of rollers mounted thereto, said rollers contacting the inner surface of the hose during the formation thereof.

Other aspects of the invention which will become apparent herein are attained by a flexible, corrugated hose for a vacuum cleaner formed by the process of: extruding a material into a tubular form; imparting uniformly spaced inwardly and outwardly extending concentric ribs into said tubular form; and defacing inner surfaces of said inwardly extending concentric ribs during said extruding process.

Still other aspects of the invention which will become apparent herein are attained by a method for forming a hose for a vacuum cleaner, comprising: extruding material into a tubular form; passing said tubular form through a blow molding rotary die for forming inwardly and outwardly extending concentric ribs in said tubular form; and roughening inner surfaces of said inwardly extending ribs while said tubular form passes through said blow molding rotary die.

Yet other aspects of the invention which will become further apparent are attained by a flexible corrugated hose for a vacuum cleaner, comprising: an elongated tubular member having inwardly and outwardly extending ribs about the circumference thereof; and a plurality of pock marks formed upon an inner surface of said inwardly extending ribs.

BRIEF DESCRIPTION OF DRAWINGS

For a complete understanding of the objects, techniques, and structure of the invention reference should be made to the following detailed description and accompanying drawings wherein:

FIG. 1 is a cross sectional view of a hose extrusion and blow molding system according to the invention;

FIG. 2 is a detailed sectional view of the extrusion die and blow tube interface of the system of FIG. 1;

FIG. 3 is a front elevational view of the blow pipe of the extrusion and blow mold system of the invention, illustrating the function of the start-up slider;

FIG. 4 is a from elevational view of the blow pipe of the invention with particular illustration of the printing cylinder thereof.

FIGS. 5–14 are respective cross sectional views taken along respective lines 5—5 through 14—14 of the printing cylinder illustrated in FIG. 4;

FIG. 15 is a front elevational view of a printing roller according to the invention;

FIG. 16 is a front elevational view of a typical guide roller or in-feed/out-feed roller according to the invention;

FIG. 17 is a cross sectional view of the rotating die of the extrusion and blow-mold system of the invention, taken along line 17—17 of FIG. 7, showing the same engaging a formed tubular work piece about the printing cylinder; and FIG. 18 is a partial cross sectional view of a flexible corrugated vacuum cleaner hose made according to the invention.

BEST MODE FOR CARRYING OUT THE INVENTION

Referring now to the drawings and more particularly FIG. 1, it can be seen that a hose extrusion and blow-molding system is designated generally by the numeral 10. An extruder 12 is provided with a feed passage 14 for passing molten or liquid plastic of a suitable nature under the influence of an appropriate drive mechanism 16. In a preferred embodiment of the invention, the drive mechanism 16 may comprise an auger, though it will be understood that a pump or any other suitable means might be employed. The drive mechanism 16 forces the molten or liquid plastic through the feed passage 14 and over the extrusion die 18 interposed within the feed passage 14. In the embodiment shown, an extrusion die 18 is in the form of a disc centrally interposed within and coaxial with the feed passage 14. Those skilled in the art will readily appreciate that the extrusion die 18 provides for the formation of a tubular work piece having a wall thickness defined by the clearance between the die 18 and the passage 14. In other words, the wall thickness of the extruded tubular member is substantially equal to the difference between the inner radius of the passage 14 and the outer radius of the die 18.

As best shown in FIG. 2, molten or liquid plastic 20 is passed through the passage 14 under the urging of the drive mechanism 16 and over the extrusion die 18 to form an appropriate tubular work piece 22. The outside diameter of the tubular work piece 22 is equivalent to the inside diameter of the passage 14, while the inner diameter thereof is equivalent to the diameter of the die 18.

As shown in FIGS. 1 and 2, an air conduit 24 passes through the passage 14 and the die 18 to be interconnected with a blowpipe assembly 26 which is maintained within the chamber 28. As illustrated, chamber 28 is defined as a portion of the extruder 12 which extends to a rotary die assembly 30. The chamber 28 is pressurized by communication through the air conduit 24 to a source of air pressure (not shown). Such communication of air pressure is achieved, in part, by the openings 32 in the collar 34 which threadedly engages the blow pipe assembly 26 with the air conduit 24. As will be readily appreciated by those skilled in the art, the air pressure within the chamber 28 and, accordingly within the tubular work piece 22, urges the work piece 22 outwardly against the inner walls of the chamber 28 and into engagement with the rotary die assembly 30 in a standard blow molding technique.

As shown in FIG. 1, the rotary die assembly 30 serves to form a flexible corrugated hose 36 from the tubular work piece 22, such hose 36 having a plurality of uniform linearly aligned and concentric ribs or rings 38. Such ribs or rings may be uniformly separated from and independent of each other, or be interconnected and convolute. Again, and as will be readily appreciated by those skilled in the art, the corrugated ribs or rings 38 are readily formed by the opposing and mating die sections 40–42 of the rotary clam shell type. Each of the die sections 40–42 seals when engaged, thereby forming an extension of the pressure chamber 28 as discussed above. As is further well known and understood by those skilled in the art, upon completion of the forming of the flexible corrugated hose 36, the same is passed to a cooling area (not shown) such as a water bath or other appropriate means to remove heat from the formed plastic material to maintain the desired molded configuration.

As shown in FIG. 3, the blow pipe assembly 26 employed in the blow molding process of the invention comprises a tube 44 having a collar 34 at one end thereof and a printing cylinder 46 at the opposite end thereof. The purpose and nature of the printing cylinder 46 will be presented later herein. Received upon the tube 44 is a slide 48 adapted for reciprocating movement thereon. As is well known and understood by those skilled in the art, the slide 48 is employed during start-up of the blow-mold operation, receiving the initial portion of the work piece 22 from the extrusion die 18 and carrying the same through the chamber 28 to the printing cylinder 46. After this transport at initial start-up, the formation of the work piece 22 and the resultant hose 36 is continuous, the work piece is moved laterally by the rotary die assembly 30 and supported internally by air pressure therein.

Referring now to FIG. 4, it can be seen that the printing cylinder 46 includes a nose 50 interconnected to one end of a cylindrical body 52 which has a tail section 54 extending from the opposite end thereof. The illustration of FIG. 4 is shown without the slide 48, since it is the structure of the printing cylinder 46 which is of particular interest.

At the end of the cylindrical body 52 adjacent the nose 50, a set of in-feed rollers 56 is provided. As shown in FIGS. 4 and 5 each of the in-feed rollers 56 is received within a cavity 57 within the body 52 and maintained upon uniquely associated axles or pins 58 which are provided in bores 60 extending through the body 52. In the preferred embodiment of the invention, three in-feed rollers 56 are provided, uniformly spaced 120° apart about the circumference of the cylindrical body 52, and having their respective axes or pins 58 lying in a common plane. As shown, the rollers 56 protrude slightly from the surface of the body 52.

Corresponding to the in-feed rollers 56 at the end of the body 52 adjacent the nose 50, are out-feed rollers 116 positioned at the end of the body 52 adjacent the tail section 54. As shown in FIG. 14, each of the out-feed rollers 116 is maintained within an associated cavity 117 and receives an axle or pin 118 in an associated bore 120. It will be noted that the out-feed rollers 116 are also spaced apart uniformly about the circumference of the body 52. In the preferred embodiment of the invention, the out-feed rollers 116 are spaced apart on the order of 120°, such that the circumferential displacement of the in-feed rollers 56 and the out-feed rollers 116 is on the order of 60°.

Positioned between the in-feed rollers 56 and out-feed rollers 116 are a plurality of axially and circumferentially spaced print rollers as illustrated in cross section in FIGS. 6 through 13. In the preferred embodiment of the invention, the print rollers are maintained in diametrically aligned pairs with each of the pairs being circumferentially displaced from all other pairs by a multiple of 22.5°. The outer surface of each of the print rollers is arcuate in nature, covering a sector of 22.5°, such that a tubular piece passing over the printing cylinder 46 will have its interior surface contacted at every point by one of the print rollers.

With specific reference now to FIG. 7, it can be seen that a first pair of print rollers 66 is provided in axial displacement from the in-feed rollers 56. The print rollers 66 are received within appropriate cavities 67 within the tubular body 52 and maintained upon associated axle pins 68 received within bores 70. The axis of alignment of the print rollers 66 is at a 45° cw rotation from the vertical axis of the cross section.

As shown in FIGS. 4 and 6, a second set of print rollers 72 are received within associated cavities 73 of the cylindrical body 52 and maintained upon axle pins 74 within associated bores 76. The print rollers 72 are aligned with each other at a 45° ccw rotation from the vertical axis of the cross section.

Continuing axially along the cylindrical body 52, print rollers 78 are apparent as shown in FIG. 8. The print rollers 78 are vertically aligned with the vertical axis of the cross section and extend from respective cavities 79 within the cylindrical housing 52. Axle pins 80 received within bores 82 provide an axis of rotation for the rollers 78.

As shown in FIG. 9, a set of print rollers 86 is aligned orthogonally with respect to the vertical axis of the cross section and extend from associated cavities 87 within the cylindrical housing 52. Again, axle pins 88 received within bores 90 provide for the rotation of the print rollers 86.

Continuing axially along the cylindrical body 52 of the printing cylinder 46, and with reference to FIG. 10, print rollers 92 extend from associated cavities 93 and are maintained upon axle pins 94 within bores 96. As shown in FIG. 10, the print rollers 92 are aligned with each other at a 22.5° cw angle from the vertical axis of the cross section.

Referring next to FIG. 11, rollers 98 extend from cavities 99 and are received upon axle pins 100 in bores 102. The print rollers 98 are aligned with each other at a 67.5° cw angle with respect to the vertical axis of the cross section as shown in FIG. 11.

Next, and as shown in FIG. 13, print rollers 110 extend from cavities 111 and are maintained upon axle pins 112 in bores 114. The print rollers 110 are aligned with each other at a 67.5° cw angle with respect to the vertical axis of the cross section.

A final print wheel assembly is shown in FIG. 12, in which the print rollers 104 extend from cavities 105 within the cylindrical body 52. The rollers 104 are maintained upon axle pins 106 within the bores 108 and are aligned with each other at a 22.5° cw angle with respect to the vertical axis of the cross section.

FIG. 15 representatively shows the print roller 78 (see FIG. 8) received upon an axle pin 80. As shown, each of the print rollers, such as the print roller 78, has an arcuate surface 81 taken across the width of the roller 78. As mentioned above, it is preferred that the size and spacing of the various print rollers employed with the cylindrical body 52 of the printing cylinder 46 be such that the entirety of the inner circumference of the work piece 22 be contacted by at least one printing roller as the work piece 22 travels the length of the cylindrical body 52. Accordingly, the circumferential displacement of the various printing rollers and the width of the arcuate surfaces of the rollers should be such to guarantee that result. In the embodiment shown in the drawings, sixteen printing rollers are provided, spaced at 22.5° intervals, and with each such printing roller having an arcuate surface extending 22.5°. Accordingly, the entire 360° interior surface of the work piece 22 is contacted by a printing roller. Of course, the major outside diameter of the printing cylinder 46 is just slightly less than the minor inside diameter of the hose being formed.

With continued reference to FIG. 15, it can be seen that each printing roller, as represented by the printing roller 78, is provided with a plurality of holes 84 passing through the arcuate surface 81 thereof. The holes 84 are provided to engage the innermost extending tacky surfaces of the extruded plastic of the work piece 22 as the same is exteriorly engaged by the rotary die assembly 30 which forms the ribs 38 to define the hose 36. The holes 84, engaging the tacky inner surface, form protrusions and/or pock marks as the holes 84 pull from the work piece as it passes thereover. To facilitate this operation, the printing rollers, as well as the in-feed and out-feed rollers, are freewheeling upon their respective axle pins with appropriate bearing mount. The free wheeling nature allows the holes or bores 84 to randomly contact the associated innermost extending surfaces interposed between the outer extending ribs 38 such that the resulting indentations or protrusions are of a random spacing. As a result, the innermost surfaces of the holes 36, interposed between the outwardly extending ribs 38, are characterized by embossed, non-uniform, randomly spaced pock marks defined by the raised and relief motif defined by the holes 84 engaging such inner surfaces.

Those skilled in the art will appreciate that the formation of the pock marks as just described is achieved at a point in the blow molding line where the extruded plastic of the work piece 22 is in a plasticized tacky state. The exact position is, of course, a function of the plastic employed, the temperature thereof, and the linear speed of the blow molding line. When positioned too early in the line, the printing roller 78 may destroy the hose 36 due to the high degree of plasticity. In like manner, when positioned too far down stream in the line, the material of the hose 36 may have set sufficiently that it is incapable of receiving the pock mark printing. In an event, it has been found most desirable to maintain the printing rollers within the section of the hose 36 which is exteriorly supported by the die assembly 30. Of course, the pressure within the hose 36 supports it internally.

While the specific dimensions of the printing rollers such as the rollers 78 and the associated holes 84 will depend upon the nature and size of the hose 36 to be manufactured, it has been found that a hose having an inside diameter of 1.25 inch and an outside diameter of 1.574 inch, and having ribs 38 spaced apart on the order of 0.1854 inch may be appropriately manufactured with printing rollers having a diameter of 0.5 inch and a width of 0.25 inch. The holes 84 within the arcuate surface of the printing roller will, in such instance, have a diameter of approximately 0.03 inch, with seventy-two such holes 84 uniformly spaced about the roller.

With brief reference to FIG. 16, it can be seen that the in-feed rollers 56, received upon the axle pins 58, are also provided with an arcuate surface 64. In the preferred embodiment of the invention, the in-feed and out-feed rollers 56, 116 and the printing rollers, such as the printing rollers 78, are identical, but for the absence of the holes or bores 84. The purpose of the in-feed and out-feed rollers is simply to provide support and stability to the work piece at both ends of the printing cylinder 46.

With reference now to FIG. 18, it can be seen that a flexible corrugated hose 124 made according to the invention may be provided with a suitable coupling 126 at an end thereof. The hose 124 comprises alternating outwardly extending ribs or rings 128 and inwardly extending ribs or rings 130. These corrugations are appropriately formed by the mating die sections 40, 42 of the rotary die 30. As shown in FIG. 18, the inwardly spaced ribs or rings 130 are characterized by randomly spaced circularly shaped protrusions 132 in the form of embossed non-uniform random pock marks which are imparted thereto by the holes or apertures 84 of the printing rollers 78. Again, the random positioning of the protrusions 132 may be a consequence of the effective random positioning of the apertures 84 resulting from the free wheeling nature of the printing rollers. In any event, it has been found that the provision of a multitude of protrusions or pock marks about the entire inner surface of the inwardly extending ribs or rings 130 provide sufficient irregularity along the inner surface of the hose 124 to prevent any whistling or harmonic noise.

To assure the most effective utilization of the pock marks 132 to prevent whistling, a truly random pattern of such pockmarks on the inner surface of the ribs 130 is desired. Accordingly, it is preferred that the apertures 84 of the printing rollers 78 not be axially aligned, but alternatingly positioned or otherwise staggered about the rollers as shown in FIG. 15. Such a configuration attains not only the desired random pock mark pattern, but also assures that no extensive lengths of the inner surface of the ribs 130 are absent such a pock mark.

It will be appreciated that the printing cylinder 46 itself comprises a portion of the blow pipe of the invention, having a central bore 62 passing therethrough and in communication with the tube 44 of the blow pipe assembly 26. Accordingly, air pressure introduced through the air conduit 24 and tube 44 finds its way to the bore 62 and out of the cavities receiving the various in-feed, out-feed, and printing rollers described above. Such communication with the central bore 62 is best shown in FIGS. 4 through 14.

It will now be appreciated that in accordance with the concept of the invention, a printing cylinder is provided with a plurality of printing rollers so configured and positioned as to contact the innermost surface of the inwardly extending ribs of the corrugated hose during the blow molding process, such printing rollers imparting protrusions upon the contacted surface with the resultant "roughened" interior of the hose assembly providing anti-whistling properties. It is also contemplated as a portion of the invention that the apertures 84 of the print rollers 78 may be replaced with protrusions in the form of small knobs or the like to achieve the desired formation of the pock marks. In that regard, it will be appreciated that those skilled in the art, having the benefit of the teachings herein, may readily perceive numerous variations on the theme presented.

Thus it can be seen that the objects of the invention have been satisfied by the structure presented above. While in accordance with patent statutes, only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A flexible, corrugated hose for a vacuum cleaner formed by the process of:

extruding a plastic material into a tubular form;

imparting uniformly spaced inwardly and outwardly extending concentric ribs into said tubular form;

printing upon the inner surfaces of said inwardly extending concentric ribs raised, circularly-shaped randomly spaced, pock marks such that adjacent inwardly extending concentric ribs have differing pock mark patterns imprinted thereon, said step of printing further comprising the step of positioning the rotational axis of a multiplicity of free wheeling print rollers inside said hose and at an angle to the hose center line whereby said print rollers roll upon the innermost surface of said inwardly extending concentric ribs thereby imprinting said surface with said pock marks.

2. The hose formed by the process according to claim 1, wherein said rollers imprint the entire circumference of each said inwardly extending concentric rib with said pock marks.

3. The hose formed by the process according to claim 1, wherein the process further comprises the step of surrounding said tubular form with an external dye and injecting pressurized gas into said tubular form thereby forcing said tubular form outwardly against said dye and forming said concentric ribs.

4. The hose formed by the process of claim 1, wherein the step of positioning the rotation axis of a multiplicity of free wheeling print rollers further comprises the step of positioning said rotational axes at right angles to said hose center line.

* * * * *